(12) United States Patent
Yako et al.

(10) Patent No.: US 7,558,802 B2
(45) Date of Patent: Jul. 7, 2009

(54) INFORMATION RETRIEVING SYSTEM

(75) Inventors: Katsushi Yako, Yokohama (JP); Norihiro Hara, Kawasaki (JP); Tadataka Matsubayashi, Machida (JP)

(73) Assignee: Hitachi, Ltd, Tokyo (JP)

( * ) Notice: Subject to any disclaimer, the term of this patent is extended or adjusted under 35 U.S.C. 154(b) by 273 days.

(21) Appl. No.: 11/344,835

(22) Filed: Jan. 31, 2006

(65) Prior Publication Data
US 2007/0100873 A1    May 3, 2007

(30) Foreign Application Priority Data
Oct. 27, 2005  (JP)  ............................. 2005-312138

(51) Int. Cl.
*G06F 17/30* (2006.01)
(52) U.S. Cl. ............................. 707/101; 707/3; 707/100
(58) Field of Classification Search .................... 707/3, 707/100, 101
See application file for complete search history.

(56) References Cited

U.S. PATENT DOCUMENTS

| | | | |
|---|---|---|---|
| 4,412,285 A | 10/1983 | Neches et al. | |
| 5,758,356 A * | 5/1998 | Hara et al. | 707/202 |
| 6,763,349 B1 * | 7/2004 | Sacco | 707/3 |
| 6,801,904 B2 * | 10/2004 | Chaudhuri et al. | 707/2 |
| 2001/0011270 A1 * | 8/2001 | Himmelstein et al. | 707/3 |
| 2002/0133485 A1 * | 9/2002 | Furuhashi | 707/3 |
| 2003/0018630 A1 * | 1/2003 | Indeck et al. | 707/3 |
| 2003/0046423 A1 * | 3/2003 | Narad et al. | 709/238 |
| 2004/0059725 A1 * | 3/2004 | Sharangpani et al. | 707/3 |
| 2004/0085953 A1 * | 5/2004 | Davis | 370/356 |
| 2004/0133564 A1 * | 7/2004 | Gross et al. | 707/3 |
| 2004/0148382 A1 * | 7/2004 | Narad et al. | 709/223 |
| 2005/0114393 A1 * | 5/2005 | Wilson | 707/104.1 |
| 2007/0100873 A1 * | 5/2007 | Yako et al. | 707/102 |
| 2007/0169179 A1 * | 7/2007 | Narad | 726/4 |

FOREIGN PATENT DOCUMENTS

| | | |
|---|---|---|
| JP | 2001-142752 | 5/2001 |
| JP | 2003-006021 | 1/2003 |
| JP | 2005-056077 | 3/2005 |

* cited by examiner

*Primary Examiner*—Don Wong
*Assistant Examiner*—Kim T Nguyen
(74) *Attorney, Agent, or Firm*—Townsend and Townsend and Crew LLP

(57) ABSTRACT

The technology for changing the nodes in an information retrieving system using a computer. When information items are registered by allocating to n nodes, steps are used to extract index information as a set of pairs of index keys of information items and addresses of information items, divide the index information into m (m>n) buckets and produce a partial inverted file to be closed within each of the buckets. Here, m and n are respectively integers of 1 (one) or above. When the allocation of the search-targeted ranges to the nodes is altered, the allocation to the buckets to each of the nodes is changed, and the partial inverted file of each bucket and the inverted file of the existing indexes are merged to produce new indexes, so that the indexes can be produced and updated with high speed.

11 Claims, 10 Drawing Sheets

INDEX INFORMATION ENTRY

| BUCKET NUMBER | DIVISION KEY VALUES | |
|---|---|---|
| 320 | 330 | |
| 0 | 12, 28, 44 | 300 |
| 1 | 13, 14, 29, 30, 45, 46 | 301 |
| 2 | 15, 31, 47 | 302 |
| 3 | 0, 16, 32 | 303 |
| 4 | 1, 2, 17, 18, 33, 34 | 304 |
| 5 | 3, 19, 35 | 305 |
| 6 | 4, 20, 36 | 306 |
| 7 | 5, 6, 21, 22, 37, 38 | 307 |
| 8 | 7, 23, 39 | 308 |
| 9 | 1, 13, 25, 37 | 309 |
| 10 | 8, 24, 40 | 310 |
| 11 | 11, 27, 43 | 311 |

FIG.4
| BUCKET NUMBER | RETRIEVAL NODE NUMBER | |
|:---:|:---:|:---:|
| 420 | 430 | |
| 0 | 0 | ～400 |
| 1 | 1 | ～401 |
| 2 | 2 | ～402 |
| 3 | 0 | ～403 |
| 4 | 1 | ～404 |
| 5 | 2 | ～405 |
| 6 | 0 | ～406 |
| 7 | 1 | ～407 |
| 8 | 2 | ～408 |
| 9 | 0 | ～409 |
| 10 | 1 | ～410 |
| 11 | 2 | ～411 |
FIG.5
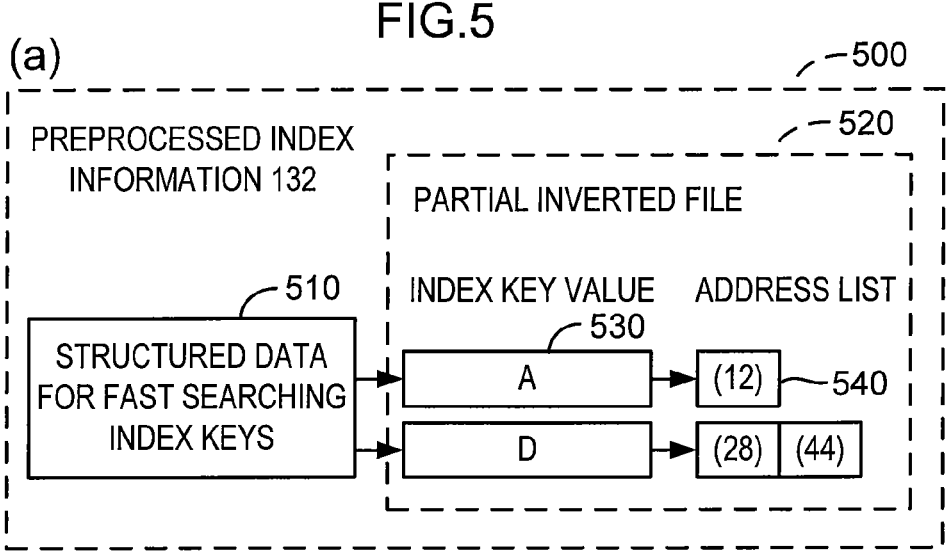
(a)
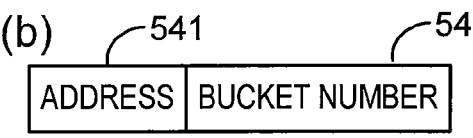
(b)

FIG.12

| BUCKET NUMBER (420) | RETRIEVAL NODE NUMBER (430) | |
|---|---|---|
| 0 | 0 | 400 |
| 1 | 1 | 401 |
| 2 | 2 | 402 |
| 3 | 3 | 403 |
| 4 | 1 | 404 |
| 5 | 2 | 405 |
| 6 | 0 | 406 |
| 7 | 3 | 407 |
| 8 | 2 | 408 |
| 9 | 0 | 409 |
| 10 | 1 | 410 |
| 11 | 3 | 411 |

INFORMATION RETRIEVING SYSTEM

BACKGROUND OF THE INVENTION

The present invention relates to an information retrieving system using index, and particularly to the addition and deletion of a retrieval node or the change of the amount of process between retrieval nodes in a retrieval system capable of parallel retrieval operations on a plurality of the nodes with the index divided.

A method of improving a processing performance is proposed for an information processing system for making information retrieval such as a database management system (hereinafter, abbreviated DBMS). That is, there is disclosed a document of "Parallel Database Systems: The Future of High Performance Database Systems", COMMUNICATIONS OF THE ACM, Vol. 35, NO. 6, 1992, P. 85-P. 98, which is a technique of an architecture for dispersing the database processing load to a plurality of processors and processing the partial loads on the processors. In the prior art given above, the shared everything, shared disk type architecture enables all the nodes or processors for making retrieval to access to all disks, but the shared nothing type architecture enables the processors to respectively access to only a disk independently belonging to each node. The shared nothing type architecture has few resources competitively accessed by processors as compared to the shared disk type architecture or to the shared everything type architecture, and thus it is excellent in the scalability.

In an information system of the shared nothing type architecture, when the amount of process on each node is required to change by the addition or deletion of a node or by the concentration of access to a particular node, it is necessary to change the amount of data imposed on each node. The most simple method for altering the amounts of data allocated on the nodes is that, after the content of database is once backed up and newly defined in its data arrangement, the backed up data is reloaded. In this method, however, when the amount of data to be treated is large-sized, a tremendous amount of processing time is taken to back up and reload.

To solve this problem, there is proposed a management technique of previously dividing data into a plurality of buckets by hash function or the like and allocating some buckets to a processor as disclosed in U.S. Pat. No. 4,412,285.

In addition, JP-A-2001-142752 discloses a technique. In this technique, data is previously divided into buckets and managed in a correspondence table of buckets and a plurality of disks. The correspondence between the buckets and the disks is changed when a disk is additionally provided because of the addition of a retrieval node so that the minimum amount of data can be moved, thus data being rearranged.

Moreover, JP-A-2003-6021 discloses another technique. In this technique, data is previously logically divided into units corresponding to the buckets by hash function and managed in association with a plurality of disks. When a disk is added, the data is rearranged in units corresponding to the buckets while processes such as retrieval, update and insertion are performed during the rearrangement of data.

Furthermore, JP-A-2005-56077 discloses the technique that the allocation of data between processors is changed without physical movement of data by changing the mapping of physical disks and virtual disks corresponding the buckets. By this technique, it is possible to exponentially shorten the time taken to change the allocation of data between processors and to dynamically increase the number of nodes as the loads on the nodes rise.

These techniques are about general data and do not particularly consider the index formed of an inverted file.

An information retrieving system having a shared nothing type index is required to alter the allocation of search-targeted ranges of the index to each node in order to add and delete nodes and to change the load balance between the nodes. The basic idea to meet this request is that the search-targeted ranges of the index is previously divided into buckets as is the general data with no index, and that the allocation of search-targeted ranges to each node is changed in units of buckets.

Here, in order to flexibly change the number of nodes and load balance between the nodes in the information processing system, it is necessary that the data size of the bucket that is the minimum unit in the data arrangement be much smaller than the amount of data allocated to each node. When the bucketsize is reduced, the number of buckets inevitably tends to increase.

In addition, the index commonly used to increase the speed of information search is formed of an inverted file that is a list of the index keys used in the retrieval and the addresses of information items matched to the index keys.

The simplest method for reallocating the index will be that partial indexes are respectively produced as bucket units and reallocated. However, since each node handles a large number of buckets as described above, there are many partial indexes in each node, and thus information retrieval operation must refer to many partial indexes with the same search key. The operation of referring to many partial indexes results in the fact that the searching of partial inverted files for a target index key occurs a large number of times. In addition, since many address lists associated with a target index key exist in a divided manner over the buckets, the address lists cannot be read in at a time. Therefore, this method is inefficient as compared to the case in which a single large-sized partial index allocated to each node unit is once referred to at a time. The deterioration of the retrieval performance is an important problem to the information processing system that chiefly makes information retrieval.

On the other hand, in order to solve this deterioration problem, it can be considered that, when the allocation of search-targeted ranges between the nodes is changed, the partial index responsible for each node unit is reproduced from the original text of the information items. However, the production of a partial index needs frequent computations because the comparing operation about the index keys occurs a number of times in order to produce the address list for each index key in the partial inverted file. In addition, frequent computations are needed for other processing operations such as the analysis of the original text of the information items and the extraction of portions associated with the index keys. When the allocation of search-targeted ranges is changed because of the increase of loads on the nodes and hence of the addition of nodes, the loads on the nodes further increase in order to produce the partial indexes for each node. Therefore, it is not appropriate to regenerate partial indexes from the original text of the information items.

SUMMARY OF THE INVENTION

An objective of the invention is to fast alter the allocation of search-targeted ranges of a retrieval system that has partial indexes of node units considering the efficiency of information retrieval.

According to the invention, when search-targeted information items are registered, they are allocated to n nodes. In this case, processes are executed to extract index information as a set of pairs of index keys and addresses from the information items, divide the index information into m (m>n) buckets, and produce a partial inverted file closed within each bucket. Here, m and n are an integer of 1 or above.

When the allocation of search-targeted ranges to the nodes is altered, the allocation of buckets to the nodes is changed, and the altered partial inverted files of the bucket units and the partial inverted file of the existing partial indexes are merged to form a new index, so that the production and update of index can be performed with high speed.

BRIEF DESCRIPTION OF THE DRAWINGS

FIG. 4 shows a data structure that indicates the correspondence between the buckets and retrieval nodes, and an example of the allocation of the buckets to three retrieval nodes in this embodiment of the invention.

FIG. 5 is a diagram showing a data structure of preprocessed index information in this embodiment of the invention.

FIG. 12 shows a data structure indicating the correspondence between buckets and retrieval nodes, and an example of the allocation of buckets to four retrieval nodes.

DETAILED DESCRIPTION OF THE EMBODIMENTS

An embodiment of the invention will be described in detail with reference to the accompanying drawings.

Figure 1:
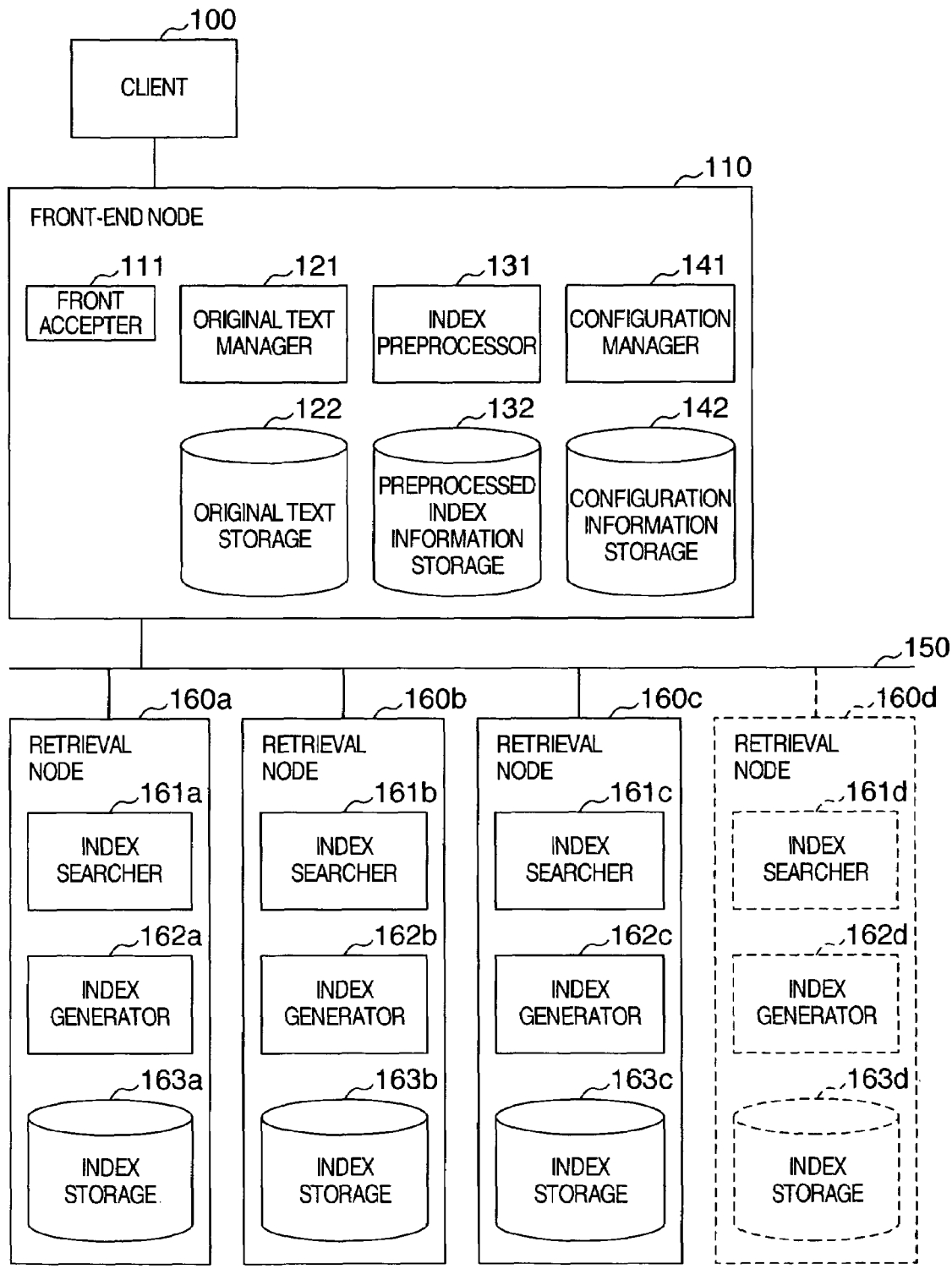
FIG. 1 is a diagram showing the construction of an information retrieving system of an embodiment according to the invention.

FIG. 1 is a diagram showing the structure of the hardware and software of an information retrieving system of an embodiment according to the invention. A client 100 is a component that issues a retrieval request to the information retrieving system of the embodiment according to the invention. The information retrieving system of the embodiment according to the invention has a front-end node 110, a plurality of retrieval nodes 160a, 160b, 160c and 160d and communication paths 150 that connect those nodes. The front-end node 110 has a front accepter 111 for accepting the retrieval request from the client 100, and an original text manager 121 for making operations of storing and reading search-targeted information items. The front-end node also has an original text storage 122 for holding the search-targeted information items, and an index preprocessor 131 for preprocessing the original text of information items and the addresses as the positional information of the information items in order to produce the index. The front-end node 110 further has a preprocessed index information storage 132 for storing the preprocessed index information, and a configuration manager 141 for managing configuration information, and a configuration information storage 142 for holding the configuration information. The configuration information is formed of the number and arrangement of retrieval nodes and the information of the buckets of preprocessed index information and the allocation of buckets to retrieval nodes. The retrieval node 160a~160d has an index searcher 161a~161d for searching the partial index, an index generator 162a~162d for generating the partial index, and an index storage 163a~163d for storing the partial index.

The front accepter 111 of the front-end node 110 in the embodiment of the invention is single, but can be considered plural for dispersing the enquiry load. Similarly, each of the original text manager 121 and original text storage 122 in this embodiment can also be considered plural according to the amount of data of stored information items and the load of access to the original text of information items. In addition, the original text manager 121 and original text storage 122, which are provided within the front-end node 110 in this embodiment, may be provided within a separate node independently of the front-end node 110 or may be provided as external components of the information retrieving system. Furthermore, although the index searcher 161a~161d and index generator 162a~162d are combined with the index storage 163a~163d within the retrieval node 160a~160d in this embodiment, the index storage 163a~163d can be separately provided as an external storage common to the retrieval nodes 160a~160d. In addition, the index searcher 161a~161d and index generator 162a~162d can be provided within separate retrieval nodes, respectively. This arrangement of components makes it possible to minimize the effect of the load due to the index update process on the information retrieval process.

The operation of the information retrieving system at the time of registering the information items that are to be searched will be described with reference to FIGS. 1 through 7. In the description of the registration of information items, it is assumed to use the three retrieval nodes 160a~160c (n=3).

Figures 2, 3:
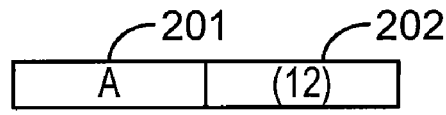
FIG. 2 shows a data structure of an index information entry extracted as source information of a partial index from information items in this embodiment of the invention.
FIG. 3 is a conceptual diagram of the logical divisions of index information associated with the respective buckets in this embodiment of the invention.

The request for the registration of an information item from the client 100 and the information item to be registered (step 700) are received by the front accepter 111 of front-end node 100 (step 701). Then, the original text manager 121 causes the original text storage 122 to store the information item received by the front accepter 111 (step 702). The index preprocessor 131 extracts an index information entry shown in FIG. 2 from the information item and its storage address (step 703). Then, the index preprocessor 131 causes a hash function to be acted on the division key of the index information entry, thereby classifying the index information entry into one of 12 (m=12) buckets (step 704). Here, the division key in this embodiment is assumed to be the address of an information item, but may be a value different from the index key extracted from the information item or may be an index key. In addition, although the bucket number is 12 in this embodiment, it should be generally a larger bucket number, for example, 256 in order to make the node division flexible. FIG. 3 shows a logical correspondence table of a bucket number 320 of 0~11 and a division key 330 of 0~47. That is, the information item is classified into one of the 12 buckets 300~311 having combinations of division keys 0~47. Thereafter, the index preprocessor 131 searches a partial inverted file 520 of preprocessed index information 132 generated for each bucket, and finds out a partial inverted file entry coincident with the index key of the information item being registered (step 705). FIG. 5 shows the structure of the preprocessed index information. The preprocessed index information 500 includes the partial inverted file 520 that is a set of index keys 530 extracted from the information items and an address list 540 of the addresses of information items produced for each index key. Each entry of the address list is formed of a pair of an address 541 and a bucket number 521 in this embodiment, and it is called the address list entry. In addition, the preprocessed index information 500 further can have a structured data for fast searching index keys, 510 as an option. This data is used as auxiliary information in order to increase the speed with which the partial inverted file 520 is searched so that the target index key can be found out when the information item is registered in the partial inverted file 520 or when a partial index is generated as a final unit corresponding to each of the retrieval nodes 160. Then, judgment is made of whether the partial inverted file 520 of the preprocessed index information 132 has a partial inverted file entry coincident with the index key of the information item being resisted (step 706). If it has not any partial inverted file entry, the partial inverted file entry corresponding to the index key is added to the partial inverted file 520 (step 707). Then, the address of the information item being registered is added to the address list 540 of the corresponding entry of the partial inverted file 520 (step 708). If the partial inverted file 520 has a partial inverted file entry coincident with the index key of the information item being registered, the program skips over the step 707 to step 708. Then, the structured data 510 of preprocessed index information 500 is updated (step 709). Subsequently, the retrieval node 160a, 160b or 160c corresponding to the information entry being resisted is determined by referring to a bucket/retrieval node correspondence table in the configuration management information of the configuration manager 141 (step 710). The bucket/retrieval node correspondence table, as shown in FIG. 4, shows pairs 400~411 of a bucket number 420 and a retrieval node number 430 associated with the bucket. The index information entry and bucket number are transferred to the determined retrieval node (step 711), and the front-end node ends the process of inserting the data from the client. The steps 710 and 711 can be performed at early stages by providing after the step 704.

Figure 6:
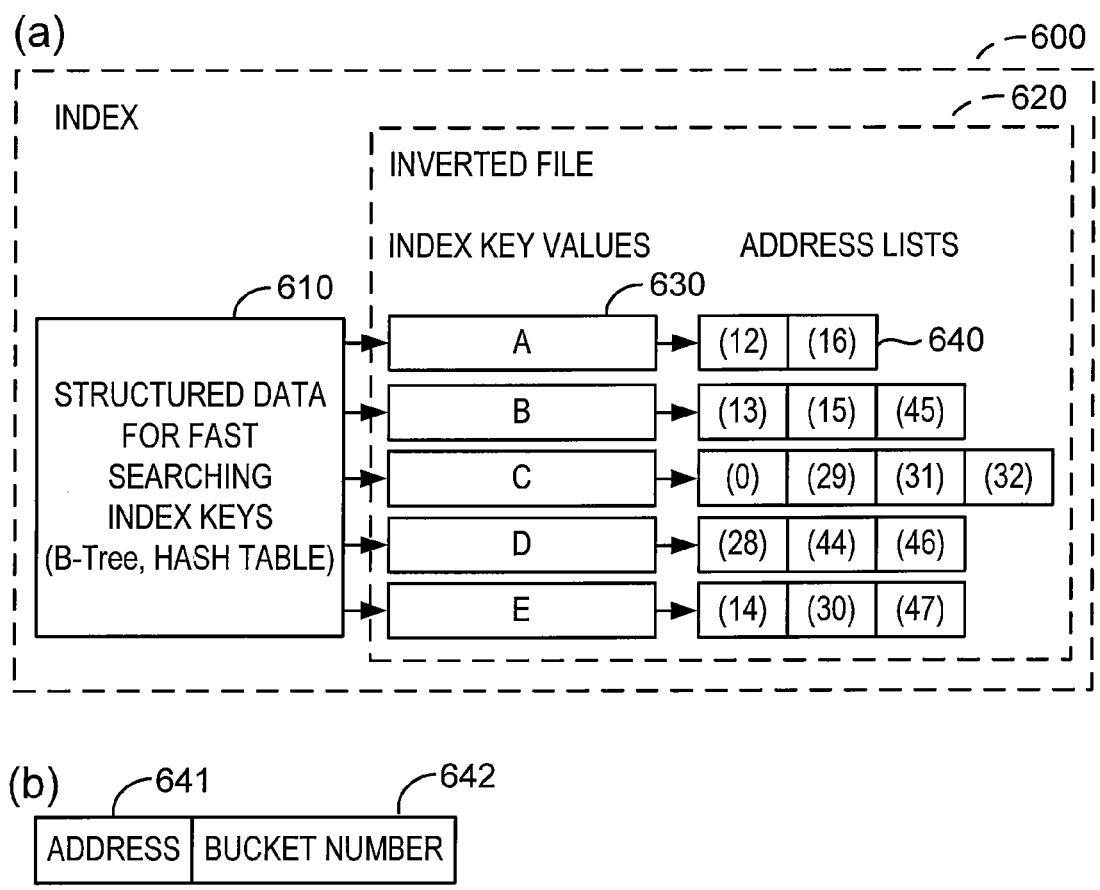
FIG. 6 is a diagram showing an example of the shared-storage structure commonly used for the index, which structure is the feature of this invention.
Figure 7:
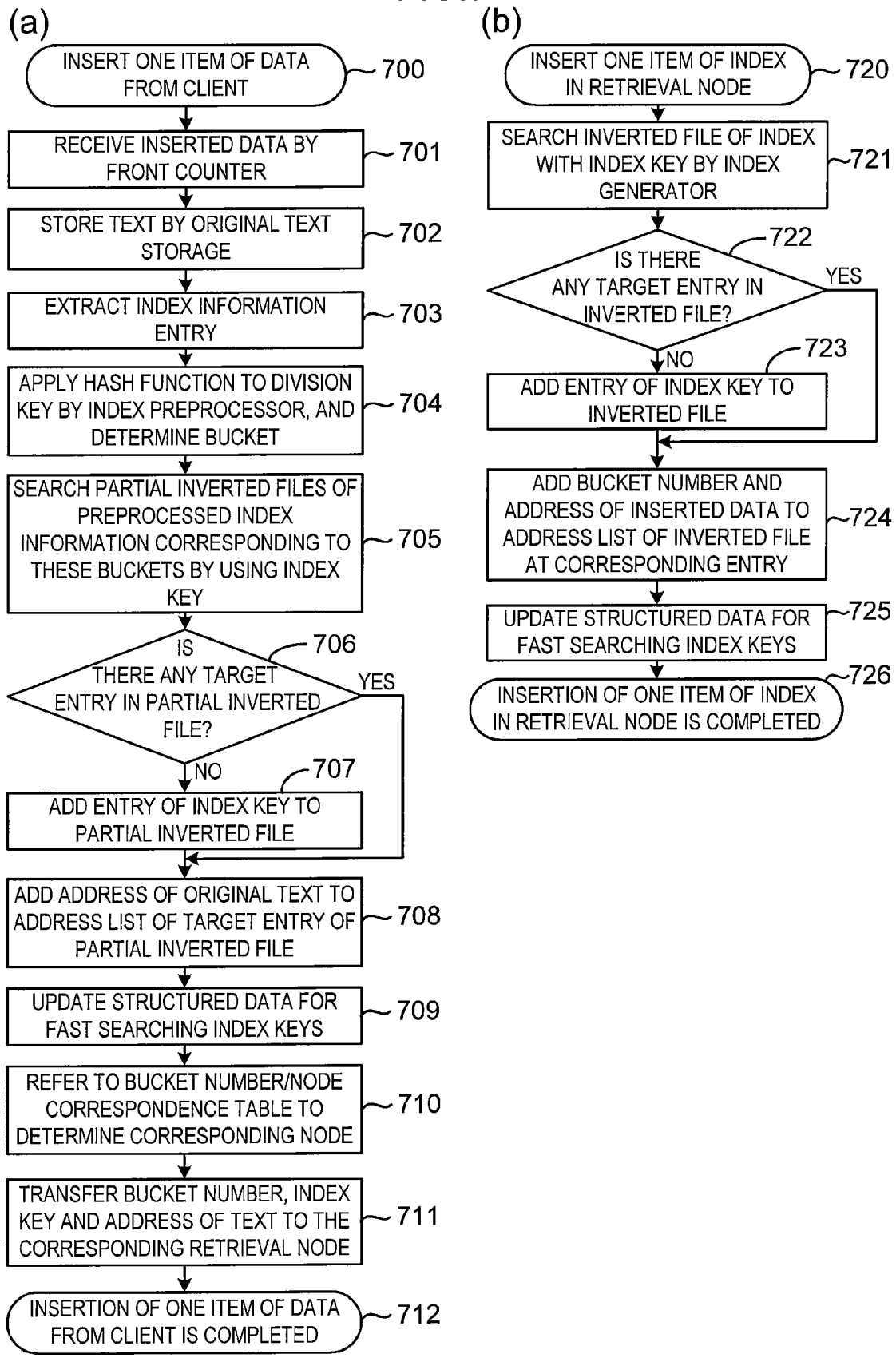
FIG. 7 is a schematic flowchart of the update of index at the time of registering search-targeted information items in this embodiment of the invention.

While the front-end node is performing the procedure of the registration of an information item from the client, the retrieval node determined in step 710 updates the index according to the process from step 720 to step 726. First, this node receives the index information entry and bucket number transferred from the front-end node in step 711. Then, it searches an inverted file 620 of index 600 for an inverted file entry 630 by using the index key of the information item being registered (step 721). FIG. 6 shows the structure of the index 600. The index 600 includes the inverted file 620 as a set of the index keys 630 extracted from the information items and address lists 640 of addresses of information items produced for the respective index keys. Each entry of the address list is formed of a pair of an address 641 and a bucket number 621 in this embodiment, and it is called the address list entry. In addition, the index 600 generally includes structured data for fast searching index keys, 610 as an option in order to increase the speed with which the target inverted file entry is found out from the inverted file 620 when information items are registered in the inverted file 620 or when reference is made to this file. Then, judgment is made of whether the inverted file 620 of index 600 has an inverted file entry coincident with the index key of the information item being registered (step 722). If it has no inverted file entry, the inverted file entry is added to the inverted file 620 (step 723). Then, the address of the information item being registered is added in the address list 640 of the corresponding entry of the inverted file (step 724). If the inverted file 620 has an inverted file entry coincident with the index key of the information item being registered, the program skips over the step 723 to step 724. Then, the structured data 610 of index 620 is updated (step 725), and the retrieval node ends the update of index (step 726).

The operation of the information retrieving system at the time of information retrieval will be described with reference to FIGS. 1 through 6, and FIG. 8. In the description of information retrieval, it is assumed to use three retrieval nodes 160a~160c (n=3).

The information retrieval request and search key issued from the client 100 (step 800) is received by the front accepter 111 of front-end node 110 (step 801). Then, the front accepter analyzes the enquiry and generates a search procedure containing the search key (step 802). The front-end node transmits the search procedure to all the retrieval nodes 160a, 160b and 160c, thus ordering them to search the index (steps 803, 804 and 805). When the front-end node finishes the issue of the order to search the index to each retrieval node, the front accepter 111 repeats the processes from step 807 to step 811 for each address to the information item text as the result of the retrieval. When an address resulting from the retrieval is received from the retrieval node 160a, 160b or 160c to the information item text (step 808), the original text manager 121 takes out an information item text from the text storage 122 by using this address (step 809), and returns it back to the client as a search result (step 810). When all the retrieval nodes finish the retrieval (step 811), the information retrieval processing is ended (step 812).

In addition, the retrieval nodes 160a, 160b and 160c simultaneously perform the processes from step 820 to step 829. When each retrieval node receives the retrieval procedure containing the search key from the front-end node (step 821), it refers to the structured data for fast searching index keys, 610 of index 600 to search the inverted file 620 the corresponding file entry 630 (step 823). If it finds out the inverted file entry 630 corresponding to the search key (step 824), it acquires the address list of the corresponding inverted file entry from the address list 640 (step 825), and sequentially returns the acquired addresses to the front-end node (steps 826, 827 and 828). When all the acquired addresses are returned (step 828), the retrieval node ends the index search (step 829).

The operation of the information retrieving system in the case of rearranging the index at the time of adding a retrieval node will be described with reference to FIGS. 1 through 6, FIG. 9 and FIG. 12. In the description of the addition of a retrieval node, it is assumed to use four nodes 160a~160d (n=4) because of adding the node 160d to the nodes 160a~160c (n=3).

The configuration manager 141 of front-end node 110, when receiving an order to change the construction due to the addition of a retrieval node, refers to the bucket/retrieval node correspondence table shown in FIG. 4 to determine the buckets corresponding to the search ranges to be allocated to the new additional node 160d (step 901). In this case, it is determined to minimize the change of the search ranges allocated to the existing retrieval nodes 160a, 160b and 160c. In this embodiment, the buckets of numbers 3, 7 and 11 selected from the allocated buckets of nodes 160a, 160b and 160c are allocated to the new node 160*d*. As a result, the bucket/node correspondence table shown in FIG. 4 is changed to the table shown in FIG. 12. By referring to the data structure of the table shown in FIG. 12, it is possible to change the allocation of buckets to the nodes and produce an index. This bucket reallocation is described in detail in JP-A-2001-142752. Then, the index preprocessor 141 reads out the preprocessed index information 500 corresponding to the buckets allocated to the new additional retrieval node 160*d* from the preprocessed index information storage 142, and transfers it to the node 160*d*, thereby ordering the node to produce the index (step 902). In addition, the bucket numbers that are anymore unnecessary in the retrieval nodes 160*a*~160*c* because of the change of allocation to the new node 160*d* are transferred to the nodes 160*a*~160*c*, ordering them to delete the search ranges (steps 903, 904 and 905). Then, the node number 430 of the bucket/node correspondence table is updated according to the bucket/node correspondence determined in step 901 (step 906), and the front-end node 110 ends the rearrangement of index (step 907).

The new node 160*d* receives all the preprocessed index information 500 transferred in step 902 (step 911), and refers to the structured information 510 of the preprocessed index information 500 to group the partial inverted file entries 530 for the respective index keys (step 912). Then, it merges the partial inverted file entries 530 grouped for the respective index keys to produce the inverted file 620 of index (step 913). In addition, it merges the structured data 510 of the respective pieces of preprocessed index information 500 to produce structured data 610 of index 600 (step 914). Finally, it causes the index storage 163*d* to store the index 600 formed of structured data 610 and inverted file 620 (step 915), and ends the index production (step 916).

The existing nodes receive a list of bucket numbers to be deleted because they are not necessary after the allocation change in step 905 (step 921). Then, each node performs the processes from step 924 to step 926 for each index key of index 600 (step 922) and for each address entry of the address list of the index key (step 923). It refers to the bucket number of each address entry (step 924), and checks if the bucket number exists in the dispensable bucket number list (step 925). If the bucket number exists, it deletes the address entry from the address list 640 of inverted file entry 630 (step 926). If the bucket number does not exist, the program goes to step 927. When the processes for all index keys and address entries are finished (step 928), the node ends the deletion of the unnecessary search range of the existing node (step 929).

Although the basic procedure for the retrieval node addition has been described above, an improved scheme for the deletion of the unnecessary search ranges of the existing nodes and for the information retrieval procedure will be disclosed next.

The index updating procedure that deletes the unnecessary search-targeted ranges of the existing retrieval nodes needs a large amount of computation. However, by changing part of the information retrieval procedure, it is possible to make the index updating procedure in parallel with the process for information retrieval request as described with reference to FIG. 10.

Figure 8:
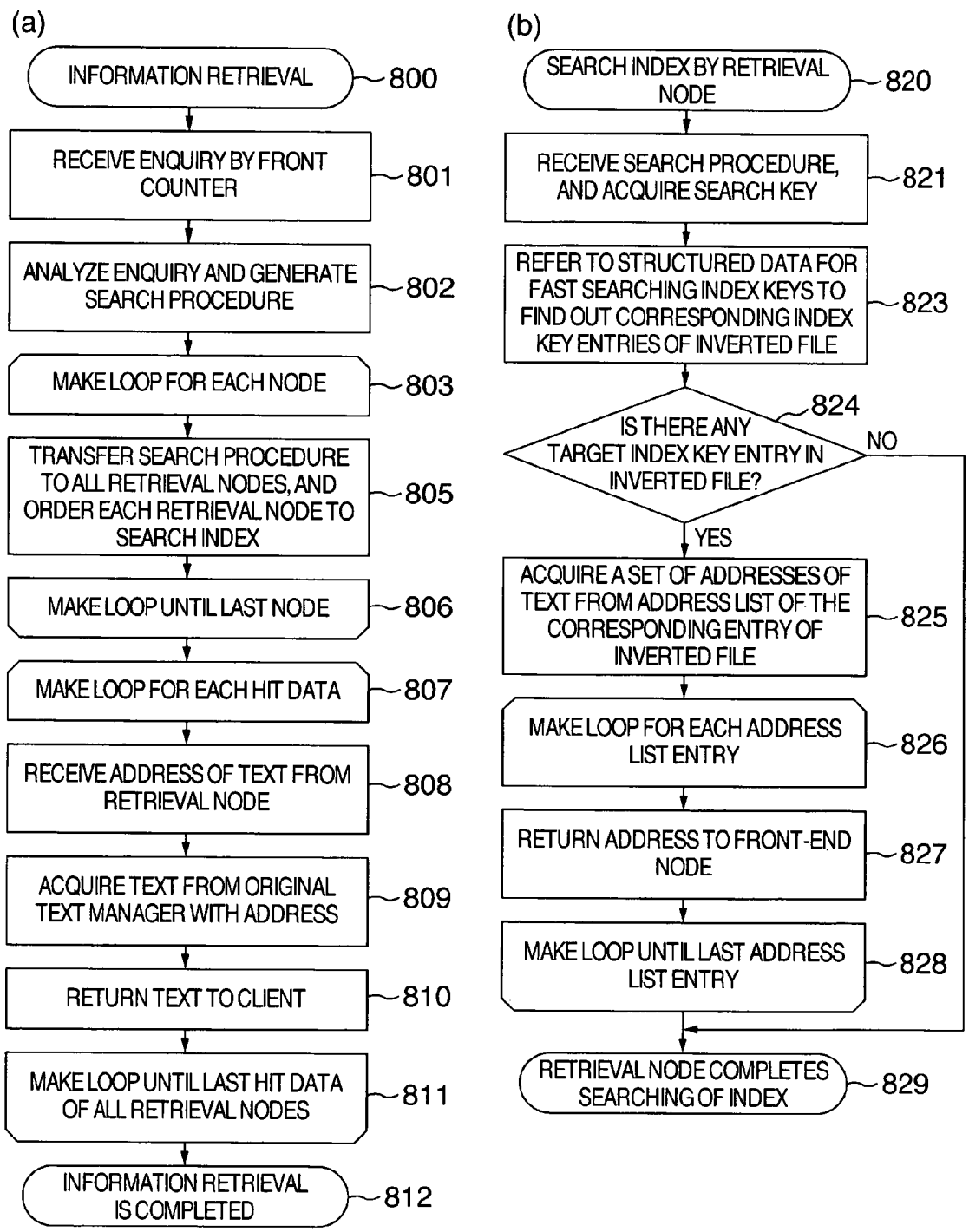
FIG. 8 is a schematic flowchart of information retrieval in this embodiment of the invention.
Figure 9:
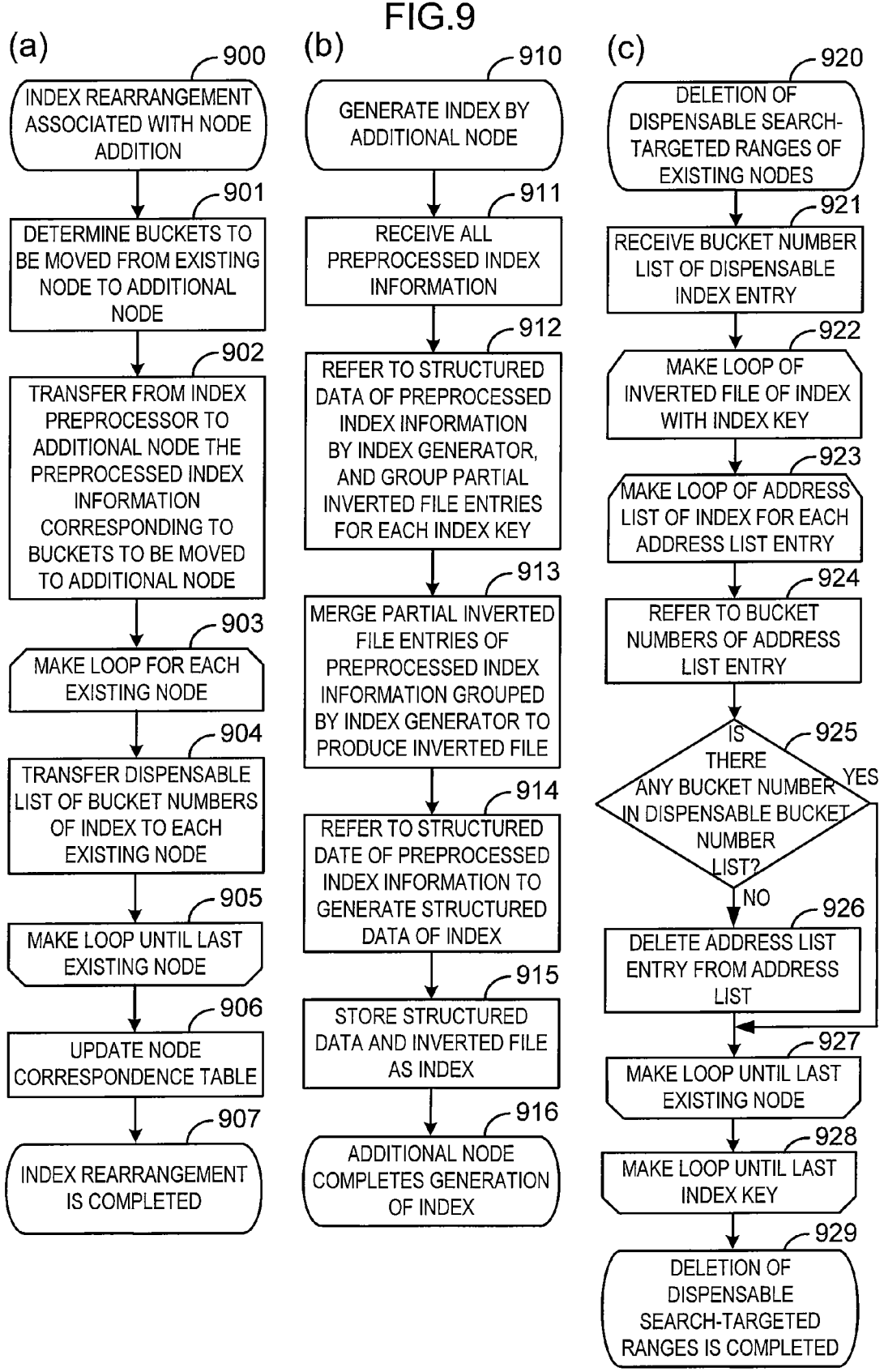
FIG. 9 is a schematic flowchart of the production and update of index at the time of adding a retrieval node in this embodiment of the invention.
Figure 10:
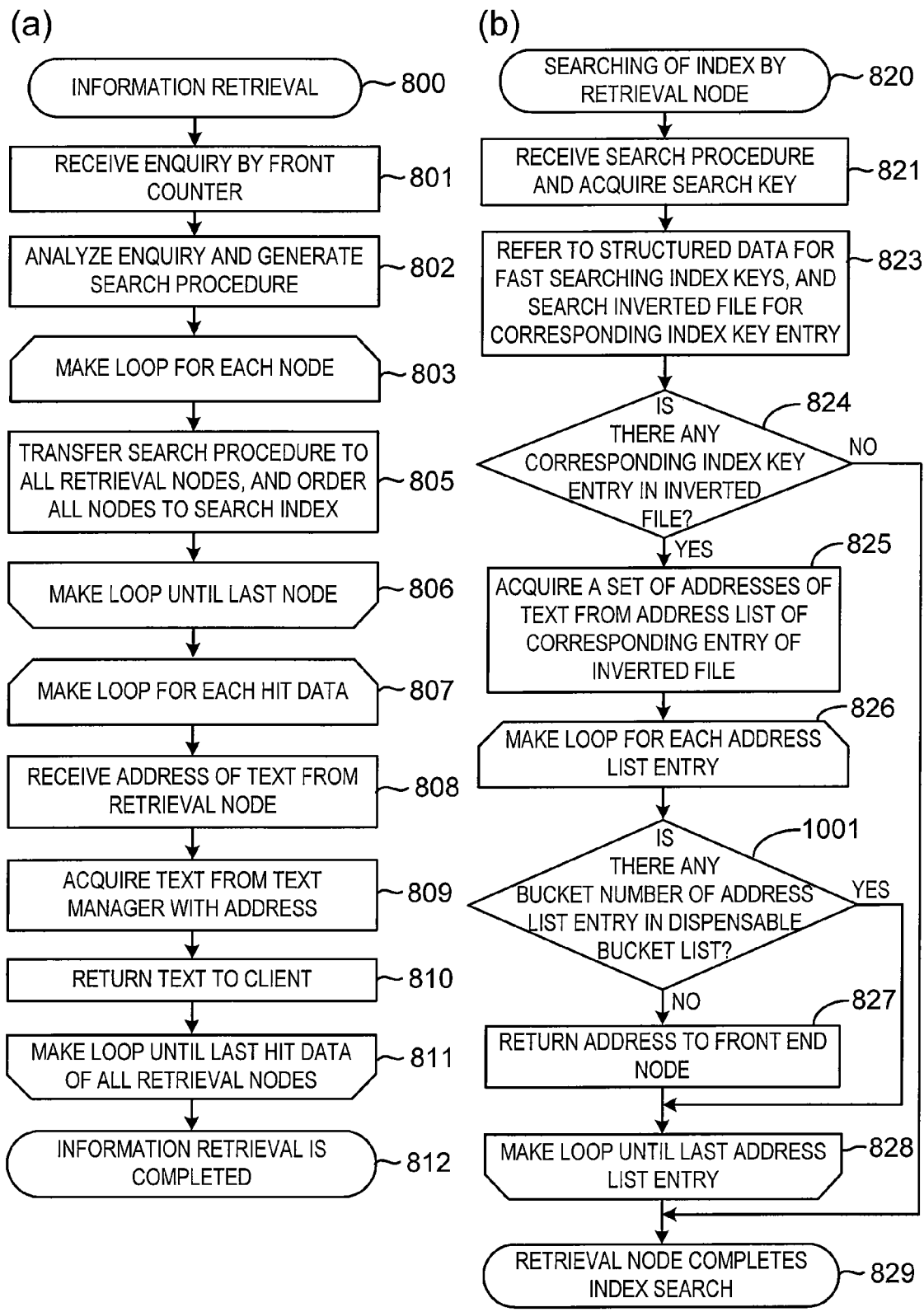
FIG. 10 is a schematic flowchart of the information retrieval during the deletion of some of the search-targeted ranges allocated to the existing retrieval nodes following the addition of a retrieval node in this embodiment of the invention.
Figure 11:
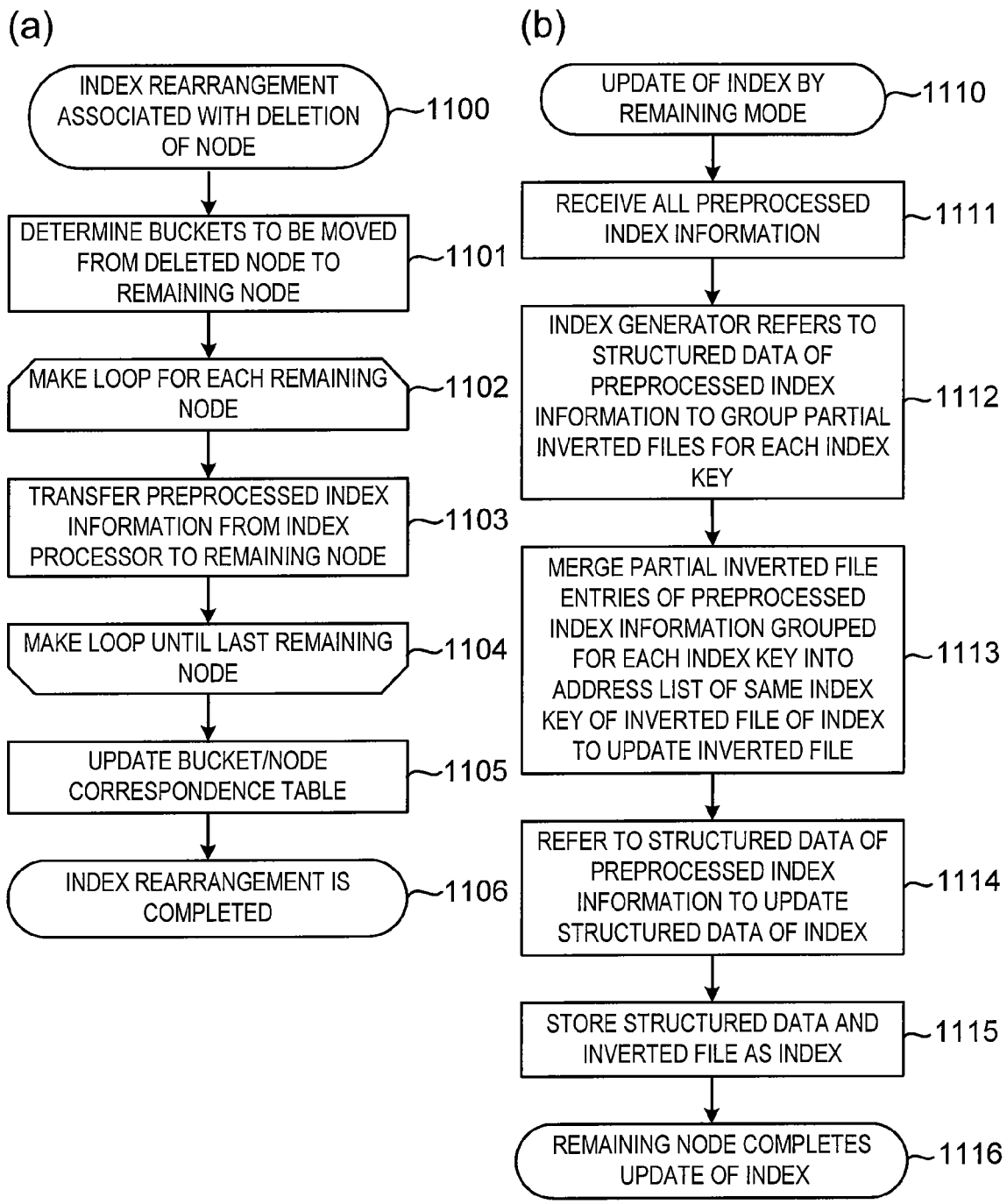
FIG. 11 is a schematic flowchart of the update of index at the time of deletion of a retrieval node in this embodiment of the invention.

The steps 800 through 812 of the information retrieval procedure in the front-end node shown in FIG. 10 are the same as shown in FIG. 8. The steps 820 through 825 of the information retrieval procedure in the retrieval node in FIG. 10 are also the same as in FIG. 8. When the retrieval node returns the addresses acquired from the address list to the front-end node 110, it checks about each address list entry (step 826) of address list 640 in the inverted file entry 630 that is coincident with the search key of the inverted file 620 of index 600. That is, it checks if the bucket number 842 of address list entry exists in the dispensable bucket number list (step 1001). If the bucket number does not exist, it returns the address to the front-end node (step 827). If the bucket number exists, the program skips over the step 827 to the step 828. When all the address entries are processed (step 828), the retrieval node ends the index search (step 829).

The operation of the information retrieving system in the rearrangement of index at the time of deleting a retrieval node will be described with reference to FIGS. 1 through 6 and FIG. 11. In this description, the retrieval nodes 160*a*~160*d* (n=4) are changed to the nodes 160*a*~160*c* (n=3) because of deletion of node 160*d*.

First, when the configuration manager 141 of front-end node 110 is ordered to change the structure because of the deletion of the retrieval node, it refers to the bucket/node correspondence table to determine the nodes to which the buckets corresponding to the search ranges allocated to the deleted node 160*d* are reallocated (step 1101). In this case, the search ranges already allocated to the remaining retrieval nodes 160*a*, 160*b* and 160*c* are not changed, but a part of the search ranges of the node 160*d* is added to the search ranges of the remaining nodes. In this embodiment, the bucket numbers 3, 7 and 11 are reallocated to the retrieval nodes 160*a*, 160*b* and 160*c*, respectively. Then, the index preprocessor 141 makes a loop of processes for each of the remaining nodes 160*a*, 160*b* and 160*c* (step 1102). That is, it reads out the preprocessed index information 500 corresponding to the bucket to be reallocated to each of the remaining retrieval nodes from the preprocessed index information storage 142, and transfers it to each node, ordering each node to update the index (step 1103). When the index update order is completely sent to all the nodes (step 1104), the retrieval node number 430 of the bucket/node correspondence table is updated according to the bucket/node correspondence determined in step 1101 (step 1105), and the front-end node 110 ends the rearrangement of index (step 1106).

Each of the remaining nodes receives all the preprocessed index information transferred in step 1103 (step 1111), and refers to the structured information 510 of preprocessed index information 500 to group the partial inverted file entries 530 for the respective index keys (step 1112). Then, each remaining node merges the grouped partial inverted file entries 530 into its inverted file of index to produce the inverted file 620 of index (step 1113). It further merges the structured data 510 of preprocessed index information 500 into the structured data 610 of index 600, thus updating (step 1114). Finally, the index storage 163*d* is caused to store the index 600 formed of the structured data 610 and inverted file 620 (step 1115), and the index update operation ends (step 1116).

Since the index keys and the addresses of search-targeted information items are previously extracted at the time of registering the search-targeted information items, this extracting operation is not required to make when the allocation of search-targeted ranges of index is changed, and thus the index production can be speeded up.

In addition, since the partial inverted file is produced for each bucket, the index keys are not required to search for the respective information items in the inverted file. That is, the address lists of the partial inverted file are searched and merged to produce the final index. Therefore, the index can be produced with high speed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An index managing method used in an information retrieving system, said method comprising the steps of:

when said information items are registered as said search-targeted ranges in said information retrieving system, said information retrieving system being constructed to have n retrieval nodes to which n divided search-targeted ranges of information that is formed of a plurality of information items of search-targeted range are respectively allocated, n divided indexes respectively corresponding to said n retrieval nodes resulting from dividing for said respective retrieval nodes, and n storages for storing said indexes respectively corresponding to said n retrieval nodes and to cause said plurality of retrieval nodes to simultaneously make information retrieval with an index searcher provided in each of said plurality of retrieval nodes by using said indexes, wherein said indexes are formed of an inverted file that has index keys and a list of address of each said information items corresponding to said index keys, when the allocation of said search-targeted range in said information retrieving system is changed, extracting one of a plurality of index key values by use and one of the information items and addresses thereof thereby to provide an index information entry as a corresponding pair;

logically dividing said index information into n buckets (m>n); and preprocessing each of said buckets of said index information entry so as to make a closed processing within each bucket, thereby producing a partial inverted file as another corresponding pair; and storing said partial inverted file as said another corresponding pair; and when the allocation of said search-targeted ranges to said retrieval nodes is changed, altering the allocation of said buckets to said retrieval nodes; and generating said indexes at said retrieval nodes by using said stored partial inverted file as said another corresponding pair corresponding to n or a plurality of ones of said buckets allocated to said retrieval nodes at the time of said allocation change.

2. A method according to claim 1, wherein when a new retrieval node is added, the following steps are used:

determining some of said buckets that are to be allocated as said search-targeted ranges to said new retrieval node;

transferring to said new retrieval node one or a plurality of pieces of said preprocessed index information corresponding to said some of said buckets allocated to said new retrieval node;

merging said address lists of the same index key values in said partial inverted file of said transferred one or plurality of pieces of said preprocessed index information entry; and producing an inverted file formed of pairs of a plurality of said key values and said merged address list within each of said retrieval nodes, thereby generating said indexes.

3. A method according to claim 1, wherein when said search-targeted range of a particular one of said retrieval nodes is extended in association with the change of the allocation of said search-targeted ranges, the following steps are used:

determining some of said buckets to be allocated to said particular retrieval node;

transferring one and plurality of pieces of said preprocessed index information entry corresponding to said buckets additionally allocated to said particular retrieval node to said particular retrieval node;

merging said address lists of the same index key values of each partial inverted file of said transferred one or plurality of pieces of said preprocessed index information into said address lists of the same index key values of said inverted file of said existing indexes of said retrieval nodes, thereby updating said index.

4. A method according to claim 1, wherein when said index is produced, a step is used to store pairs of bucket numbers and addresses in said address list, and when a part of said search-targeted ranges of a particular retrieval one of said retrieval node is deleted in association with the change of the allocation of said search-targeted range, the following steps are used:

determining some of said buckets that are released from the allocation to said particular retrieval node; and searching said address lists within said inverted file of said index and deleting the addresses of the allocation-released bucket numbers from said address lists, thereby updating said index.

5. A method according to claim 1, wherein when said index is generated, a step is used to store pairs of bucket numbers and addresses in said address list, and when a part of said search-targeted range of a particular retrieval one of said retrieval nodes is deleted in association with the change of the allocation of said search-targeted ranges, the following steps are used:

determining some of said buckets that are released from the allocation to said particular retrieval node;

search said address lists within said inverted file of said index and deleting the addresses of the allocation-released bucket numbers from said address list, thereby updating said index;

storing said allocation-released buckets in an ineffectual bucket number table; and referring to said inverted file of said index in response to an information search request and referring to said ineffectual bucket number table in accordance with said obtained list of addresses and bucket numbers to exclude the addresses of ineffectual buckets, whereby said indexes is updated while said information retrieval processing is being performed under the condition in which said part of said allocated search-targeted range is completely deleted.

6. An information retrieving system comprising:

a processor, n retrieval nodes to which a divided search-targeted ranges of the information formed of a plurality of information items are respectively allocated, n divided indexes resulting from dividing in units of said retrieval nodes, and n storages for storing said indexes, and to cause said plurality of retrieval nodes to simultaneously make information retrieval by using said indexes, wherein said indexes are formed of an inverted file as a list of index key values and addresses of said information items corresponding to said index, wherein when said information items are registered as said targeted ranges in an allocation in said information retrieving system, the following means are used:

means for extracting said index information as a set of pairs of said index keys and said addresses of said information items; and means for preprocessing said indexes by logically dividing said index information into m (m>n) buckets, generating an address list as a list of said index keys and addresses of the information coincident with said index keys from said buckets resulting from dividing said index information, and producing partial inverted files each formed of pairs of said plurality of index keys and said addresses within each of said buckets; and said information retrieving system being constructed to have n retrieval nodes to which n divided search-targeted ranges of information that is formed of a plurality of information items of search-targeted range are respectively allocated, n divided indexes respectively corresponding to said n retrieval nodes resulting from dividing for said respective retrieval nodes, and n storages for storing said indexes respectively corresponding to said n retrieval nodes and to cause said plurality of retrieval nodes to simultaneously make information retrieval with an index searcher provided in each of said plurality of retrieval nodes by using said indexes, wherein said indexes are formed of an inverted file that has index keys and a list of addresses of each of said information items corresponding to said index keys, when the allocation of said search-targeted ranges in said information retrieving system in changed, an index preprocessor is used that has:

means for extracting one or a plurality of index key value of said information item;

means for logically dividing said index information into m buckets (m·n); and means for generating preprocessed index information by preprocessing said index information so as to make a closed processing within each bucket, and another storage is used to store said partial inverted file as said another corresponding pair preprocessed index information, and further when the allocation of said search-targeted ranges to said retrieval nodes is changed, the following means are used:

means for the configuration management to change the allocations of said buckets to said retrieval nodes; and means for generating said indexes at said retrieval nodes by using said partial inverted file as said another corresponding pair corresponding to said one or plurality of buckets allocated to said retrieval nodes due to the change of said allocation.

7. An information retrieving system according to claim 6, wherein when a new retrieval node is added, the following means are used:

means for determining some of said buckets that are to be allocated as said search-targeted ranges to said new additional retrieval node;

means for transferring said one or plurality of pieces of preprocessed index information corresponding to said buckets allocated to said new retrieval node to said new additional retrieval node;

means for merging said address lists of the same index key values contained in the partial inverted files of said transferred one or plurality of pieces of preprocessed indexed information entry; and means for generating said indexes by producing said inverted file formed of pairs of said plurality of index key values and said merged address lists within each of said retrieval nodes.

8. An information retrieving system according to claim 6, wherein when said search-targeted ranges of a particular one of said retrieval nodes are extended in association with the change of the allocation of said search-targeted ranges, the following means are used:

means for determining some of said buckets that are to be allocated to said particular retrieval node;

means for transferring said one or plurality of preprocessed index information entry corresponding to said newly allocated buckets to said particular retrieval node; and means for merging so that said address lists of the same index key values contained in the partial inverted files of said transferred one or plurality of pieces of preprocessed index information entry can be merged into the address lists of the same index key values contained in the inverted file of said indexes existing in said retrieval nodes, thus updating said indexes.

9. An information retrieving system according to claim 6, wherein said indexes are produced, means is used to store pairs of said bucket numbers and said addresses in said address list, and when a part of said search-targeted ranges of a particular one of said nodes is deleted in association with the change of the allocation of said search-targeted ranges, the following means are used:

means for determining some of said buckets that are to be released form the allocation to said particular node; and means for searching the address lists within said inverted file of said indexes to delete the addresses attached with the bucket numbers of said allocation-released buckets from said address lists, thereby updating said indexes.

10. An information retrieving system according to claim 6, wherein when said indexes are produced, means is used to store pairs of said bucket numbers and said addresses in said address list, and when a part of said search-targeted ranges of a particular one of said nodes is deleted in association with the change of the allocation of said search-targeted ranges, the following means are used:

means for determining some of said buckets that are to be released from the allocation to said particular retrieval node;

means for searching the address lists within said inverted file of said indexes to delete the addresses attached with the bucket numbers of said allocation-released buckets from said address lists, thereby updating said indexes, storing said allocation-released buckets in an ineffective bucket number table, referring to said inverted file of said indexes in response to an information search request and referring to said ineffective bucket number table by using the list of said obtained addresses and bucket numbers so as to remove said ineffective bucket addresses; and means for updating said indexes while said information retrieval processing is being performed under the condition that the logical deletion of part of said search-targeted ranges is completed.

11. A computer-readable storage medium having stored thereon a computer-readable information retrieval program, said program comprises the steps of:

when said information items are registered as said search-targeted ranges in said information retrieving system;

extracting one of a plurality of index key values by use of said information items; and addresses thereof thereby to provide an index information entry as a corresponding pair;

logically dividing said index information into m (m>n) buckets;

generating said index key values and an address list of addresses of information coincident with said index key from said buckets of said index information; and producing a partical inverted file formed of pairs of a plurality of said index keys and said address lists within each of said buckets, thereby making said index preprocessing; and said information retrieving system being constructed to have n retrieval nodes to which n divided search targeted ranges of information that is formed of all plurality of information items of search-targeted range are respectively allocated, n divided indexes, respectively corresponding to said n retrieval nodes, and to cause said plurality of retrieval nodes to simultaneously make information retrieval with an index searcher provided in each of said plurality of retrieval nodes, by using said indexes, wherein said indexes are formed of an inverted file that has index keys and a list of addresses of each of said information items corresponding to said index keys;

when the allocation of said search-target ranges in said information retrieving system, is changed having computer codes to be run on a computer system having n retrieval nodes to which n divided search-targeted ranges are allocated that result from diving information formed of a plurality of information items, n indexes resulting from dividing in units of said retrieval nodes, and n storages for storing said indexes, and to cause said plurality of retrieval nodes to simultaneously make information retrieval by using said index, wherein said indexes are formed of an inverted file as a list of index keys and addresses of said information items corresponding to said index keys, extracting one or a plurality of index key value by use of one of said addresses of said one of the information items; and addresses thereof thereby to provide an index information entry as a corresponding pair;

logically dividing said index information into m (m>n) buckets;

preprocessing each of said buckets of said index information entry so as to make a closed processing within each bucket, thereby producing a partial inverted file as another corresponding pair; and storing said partial inverted file as said another corresponding pair; and when the allocation of said search-targeted ranges to said retrieval nodes is changed, altering the allocation of said buckets to said retrieval nodes; and generating said indexes at said retrieval nodes by using said partial inverted file as said another corresponding pair; corresponding to one or a plurality of ones of said buckets allocated to said retrieval nodes due to the change of said allocation.

* * * * *